United States Patent [19]

Akiyama

[11] Patent Number: 5,211,262

[45] Date of Patent: May 18, 1993

[54] HYDRAULIC OIL SUPPLYING APPARATUS FOR AUTOMATIC TRANSMISSION

[75] Inventor: Masaya Akiyama, Fuji, Japan

[73] Assignee: Jatco Corporation, Fuji, Japan

[21] Appl. No.: 945,894

[22] Filed: Sep. 17, 1992

[30] Foreign Application Priority Data

Sep. 20, 1991 [JP] Japan .................. 3-270079

[51] Int. Cl.5 .............................. F01M 9/00
[52] U.S. Cl. .................... 184/6.12; 74/467
[58] Field of Search .......... 184/6.12, 31, 101; 74/467

[56] References Cited

U.S. PATENT DOCUMENTS 4,501,167 2/1985 Saito .................. 184/6.12
4,754,847 7/1988 Glaze et al. .......... 184/6.12

FOREIGN PATENT DOCUMENTS 0163860 9/1983 Japan ................... 74/467
4-84778 7/1992 Japan .
2166816 5/1986 United Kingdom ........ 74/467

Primary Examiner—Thomas E. Denion
Attorney, Agent, or Firm—Oliff & Berridge

[57] ABSTRACT

A drain path extending from a control valve mounted upper an oil pump is designed to make unit sizes small. The drain path is formed using a groove on a joint surface where an oil pump housing is secured to a transmission case. The drain path is formed without any extension around a bearing holding portion for a counter shaft while it overlaps the bearing holding portion as seen in the axial direction. Thus, the whole structure of an automatic transmission can be designed in smaller dimensions. A supply hole is formed in the bearing holding portion so as to allow hydraulic oil drained from the drain path to be delivered to the transmission. The bearing holding portion may be dislocated to another position corresponding to design change for a counter shaft.

8 Claims, 4 Drawing Sheets

HYDRAULIC OIL SUPPLYING APPARATUS FOR AUTOMATIC TRANSMISSION

BACKGROUND OF THE INVENTION

1. Field of the Invention

The present invention relates generally to a hydraulic oil supplying apparatus for an automatic transmission. More particularly, the present invention relates to an improvement of a hydraulic oil supplying apparatus of the foregoing type including a drain path by way of which hydraulic oil is drained after it is delivered from an oil pump to a control valve.

2. Statement of the Related Art

A lay-out concept as shown in FIG. 4 wherein a hydraulic pressure control valve 1 for an automatic transmission (not shown) is mounted on the upper portion of a transmission case 4, a discharge port 8 of an oil pump 2 is disposed on the upper side of the oil pump 2 and a suction port of the oil pump 2 is disposed on the lower side of the same so as to allow hydraulic oil to be sucked up from an oil reservoir 3 on the bottom of the transmission case 4 and then delivered to the control valve 1 has been already proposed by a common assignee to the present invention under Japanese Utility Model Application Laying-open No. 4-84778.

In contrast with another conventional lay-out concept wherein a suction port and a discharge port are disposed on the lower side of an oil pump with the result that there arises a malfunction that it is difficult to arrange oil communication paths, by way of which a torque converter, a cooler, a front clutch, a rear clutch or the like are communicated with the oil pump, without any interference with the suction path and the discharge path each having a considerably large cross-sectional area, the first-mentioned lay-out concept assures that the aforementioned paths can considerably easily be arranged in the vicinity of the oil pump.

According to the first-mentioned lay-out concept, it is proposed that a drain path 9 is arranged so as to allow the oil drained from the control valve 1 to be conducted to the suction port 6 of the oil pump 2.

With this lay-out concept, however, if it is attempted that a drain path is arranged on a member having a plurality of communication paths formed thereon without any interference with these communication paths and associated ports concentratively located in the vicinity of the oil pump, there unavoidably arises a necessity that the space occupied by the oil pump as seen in the axial direction is enlarged by a quantity corresponding to the cross-sectional area of the drain path or the drain passage is arranged with dimensions increased in the radial direction. Especially, a converter housing or a transmission case having the oil pump arranged therein is equipped with a bearing for a counter shaft of a transmission mechanism in addition to the oil communication paths and associated ports. Thus, there is a possibility that although the communication paths and associated ports can easily be arranged in the vicinity of the oil pump, the whole automatic transmission is designed to have larger dimensions due to the arrangement of the foregoing bearing without any interference with the communication paths and associated ports. Otherwise, it is imagined that the drain path is formed using a pipe. In this case, however, there arises a problem that the manufacturing cost would be high.

SUMMARY OF THE INVENTION

The present invention has been made in consideration of the aforementioned background.

An object of the present invention is to provide a hydraulic oil supplying apparatus for an automatic transmission including a drain path by way of which drained hydraulic oil is conducted to a suction path for an oil pump wherein it is assured that the oil pump and associated components are dimensioned to have smaller unit sizes.

Another object of the present invention is to provide a hydraulic oil supplying apparatus of the foregoing type for an automatic transmission wherein the drained oil is effectively utilized for the automatic transmission.

According to the present invention, there is provided a hydraulic oil supplying apparatus for an automatic transmission comprising:

a transmission case having a gear type speed changing mechanism incorporated therein and including a hydraulic control valve for properly controlling the speed changing mechanism at the upper portion thereof and a bearing holding portion for a counter shaft;

an oil pump housing secured to the transmission case via a joint surface thereof, the oil pump housing being formed with a central through hole through which an input shaft extends, a gear chamber receiving pump gears therein, a discharge path and a suction path arranged in substantial alignment with each other in the vertical direction, and a substantially arch-shaped first groove extending to the lowermost end of the suction path on the joint surface to constitute a drain path from the control valve, the first groove overlapping the bearing holding portion when it is observed in the direction at a right angle relative to the joint surface; and a pump cover secured to the oil pump housing to cover the gear chamber therewith.

Here, the transmission case may be formed with a second groove corresponding to the first groove on a joint surface to the oil pump housing, the first groove and the second groove constituting the drain path from the control valve.

A supply hole may be formed on the wall of the bearing holding portion so as to allow hydraulic oil to be supplied to the bearing holding portion from the drain path, the supply hole being kept opened in communication with the drain path.

A check valve may be disposed in the supply hole.

The second groove may be dimensioned to have a first predetermined depth in the region where it overlaps the bearing holding portion as seen in the axial direction perpendicular to the joint surface, the first predetermined depth being less than a depth in the region other than the foregoing region and the first groove may be dimensioned to have a second predetermined depth in the region where it overlaps the bearing holding portion as seen in the axial direction perpendicular to the joint surface, the second predetermined depth being more than a depth in the region other than the foregoing region.

The oil pump housing is secured to the transmission case by a plurality of bolts arranged in the substantially annular relationship, and the first groove is located outside of the bolts as seen in the radial direction.

With this construction, the drain path is formed using the groove on the joint surface where the oil pump housing is secured to the transmission case, while it overlaps the bearing holding portion for a counter shaft as seen in the axial direction perpendicular to the joint surface. Consequently, the drain path can be formed not only without any interference with many paths and associated ports arranged in the vicinity of an oil pump but also without any extension of the drain groove around the bearing holding portion, whereby the transmission can be designed in smaller unit sizes. As hydraulic oil is drained from the control valve, it is smoothly conducted to an oil pump suction port.

Since the drain path is arranged so as to overlap the bearing holding portion for the counter shaft, it is not necessary to change the passage of the drain path in order to avoid an interference with the bearing holding portion in the case that the counter shaft is dislocated to modify the apparatus, resulting in a degree of design freedom in respect of lay-out being large.

Similarly, since the drain path overlaps the bearing holding portion for the counter shaft and the supply hole which is opened to the drain path is formed on the wall of the transmission case at the bearing holding portion, hydraulic oil can be supplied to the bearing holding portion via the supply hole. Consequently, there are advantages that the bearing of the counter shaft is reliably lubricated irrespective of the height or position of the bearing.

Other objects, features and advantages of the present invention will become apparent from reading of the following description which has been prepared in conjunction with the accompanying drawings.

BRIEF DESCRIPTION OF THE DRAWINGS

The features of the present invention will become more apparent when the present invention is explained with reference to the following drawings in which.

DESCRIPTION OF THE PREFERRED EMBODIMENT

The present invention will now be explained in detail hereinafter with reference to the accompanying drawings which illustrate a preferred embodiment of the present invention.

Figure 1:
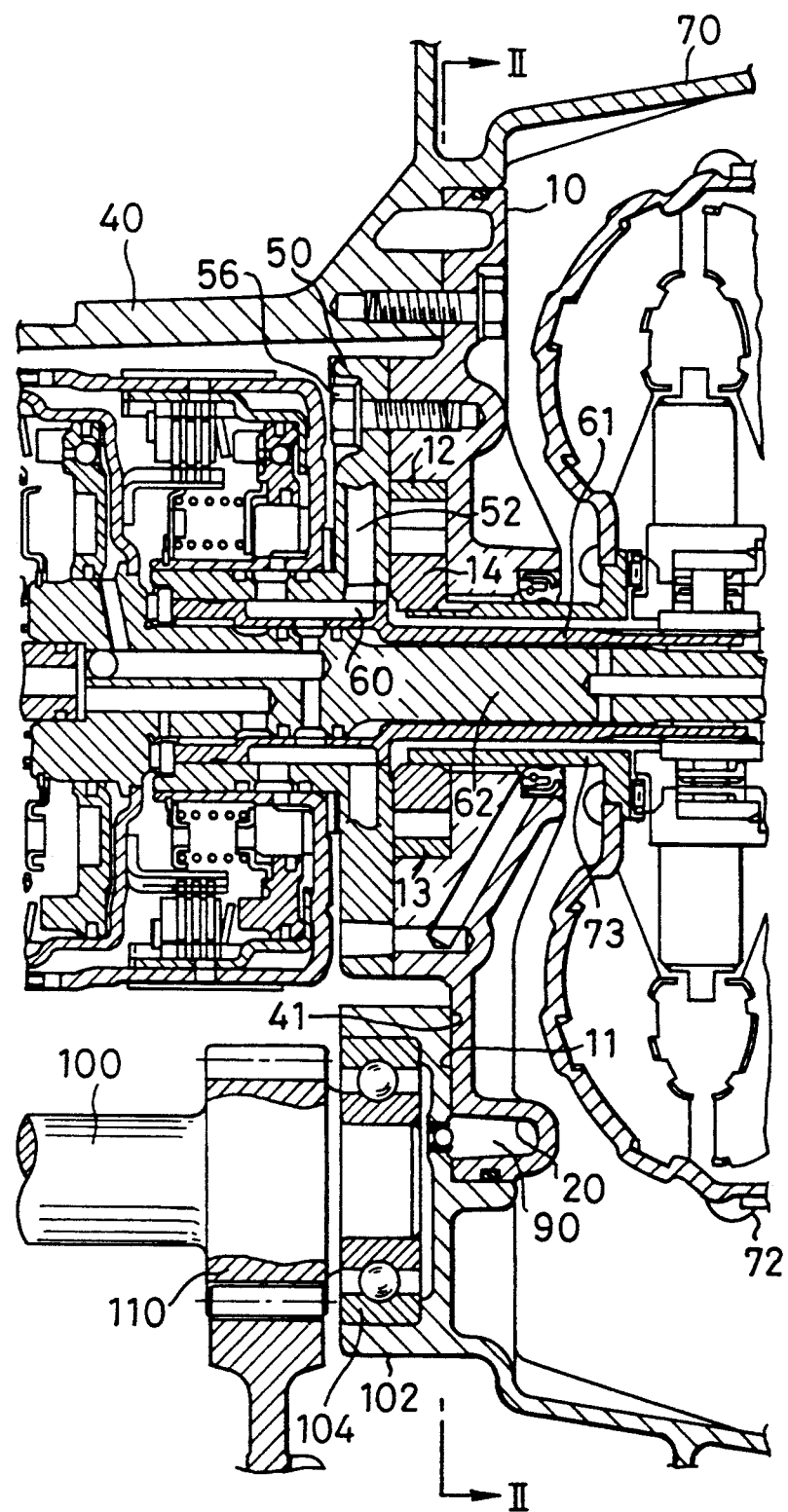
FIG. 1 is a fragmentary sectional view of an automatic transmission for which a hydraulic oil supplying apparatus in accordance with an embodiment of the present invention is employed, particularly illustrating an oil pump and associated components.
Figure 2:
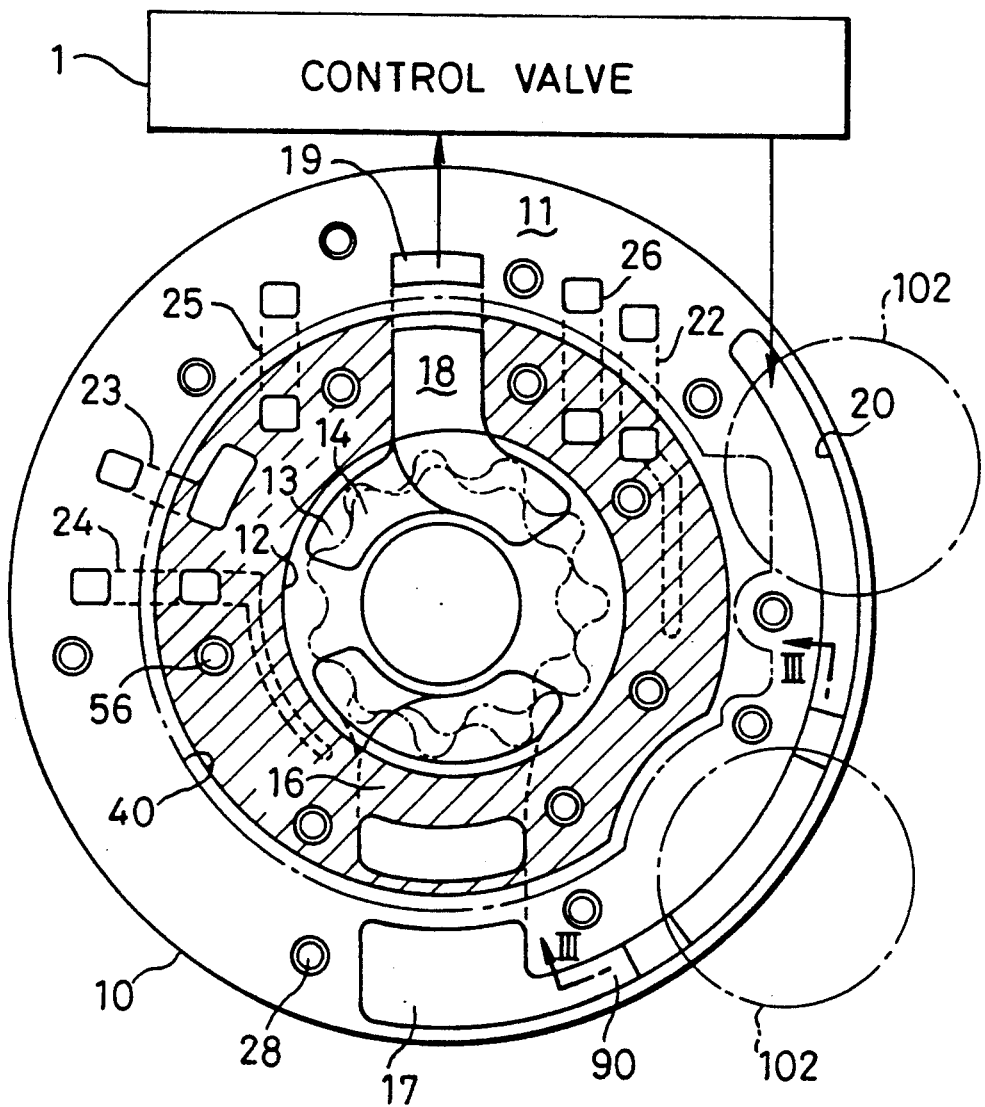
FIG. 2 is a sectional view of the transmission taken along line II—II in FIG. 1.

Referring to FIG. 1 and FIG. 2, an oil pump housing 10 includes a gear chamber 12 at the central part thereof in which an outer gear 13 and an inner gear 14 each serving as a pump gear constituting an oil pump are received, and the gear chamber 12 is covered with an oil pump cover 50. The outer gear 13 is rotatably received in the gear chamber 12 in the concentrical relationship and the inner gear 14 meshing with the outer gear 13 is arranged eccentrically relative to the latter so that both the gears 13 and 14 are rotationally driven by a common hollow shaft 73 adapted to be rotated together with a pump impeller in a torque converter 72. The oil pump housing 10 is formed not only with a wide groove or path extending downwardly of the side part of the gear chamber 12 but also with a groove extending upwardly of the same while reducing a width thereof. The foregoing respective grooves form a suction path 16 and a discharge path 18 in cooperation with respective grooves formed on the oil pump cover 50 wherein the suction path 16 extends downwardly of the gear chamber 12 in the substantially vertical direction and the discharge path 18 extends upwardly of the gear chamber 12 in the same direction as that of the suction path 16.

A suction port 17 at the lower end of the suction path 16 is communicated with an oil reservoir (not shown) located below a transmission case 40, while a discharge port 19 at the upper end of the discharge path 18 is communicated with a control valve 1 mounted on the upper portion of the transmission case 40. Specifically, the suction port 17 is communicated with a reservoir suction port via a path (not shown) formed in the transmission case 40 connected to the oil pump casing 10 in the face-to-face relationship, while the discharge port 19 is communicated with the control valve 1 via a path (not shown) formed in the transmission case 40.

From the control valve 1 hydraulic oil of which pressure is properly regulated flows in the path formed in the oil pump housing 10 via the path formed in the transmission case 40, and thereafter, it flows in a path 52 formed in the oil pump cover 50. Subsequently, it is conducted to an oil path 60 formed in a transmission input shaft portion which extends through at the center of the oil pump housing 10 and the oil pump cover 50. In the shown embodiment, the transmission input shaft portion includes a hollow shaft 61 operatively connected to a stator of the torque converter 72 via an one-way clutch and an input shaft 62 extending through the hollow shaft 61, and the oil path 60 is formed around the outer peripheral surface of the hollow shaft 61.

In addition, a path/opening 22 by way of which the oil path 60 of the transmission input shaft portion is communicated with the converter 72, a path/opening 23 and a path/opening 24 by way of which the oil path 60 is communicated with the oil cooler, and a path/opening 25 and a path/opening 26 by way of which the oil path 60 is communicated with the front clutch and the rear clutch are formed on the oil pump housing 10 and the oil pump cover 50. In the shown embodiment, since the oil pump housing 10 is prepared separately from the transmission case 40 and a converter housing 70, the aforementioned paths/openings can easily be formed by employing a casting process. Referring to FIG. 2, a plurality of bolts 56 located at the positions offset toward the center axis are used for securing the oil pump cover 50 to the oil pump housing 10, while a plurality of bolts 28 substantially annularly arranged outside of the bolts 56 are used for securing the oil pump housing 10 to the transmission case 40.

A substantially arch-shaped groove 20 is formed along the outer periphery portion of the oil pump housing 10 in such a manner as to surround the oil paths, the openings and the bolts as mentioned above. This groove 20 is kept opened at a joint surface 11 where the transmission case 40 is secured to the oil pump housing 10, and extends from the position in the vicinity of the control valve 1 down to the suction port located at the lowermost end of the oil pump housing 10. In addition, a groove 42 having the same length as that of the groove 20 is formed on another joint surface 41 where the oil pump housing 10 is secured to the transmission case 40, corresponding to the groove 20, whereby a drain path 90 is formed by the groove 20 on the pump housing 10 and the groove 42 on the transmission case 40. When the drain path 90 is observed in the direction at a right angle relative to both the joint surfaces 11 and 41, it is recognized such that it overlaps a bearing holding portion 102 for holding a bearing 104 for a counter shaft 100 disposed opposite to the joint surface 41 on the transmission case 40. Thus, the drain path 90 is formed within the range which is equal to diametrical dimensions of the converter 72 or smaller than those of the converter 72 (see FIG. 1).

As hydraulic oil is drained from the control valve 1 while overflowing therefrom, it is conducted to the upper end of the drain path 90 via the path formed in the transmission case 40 and then flows down to the suction port 17 at the lower end of the oil pump suction path 16.

Figure 3:
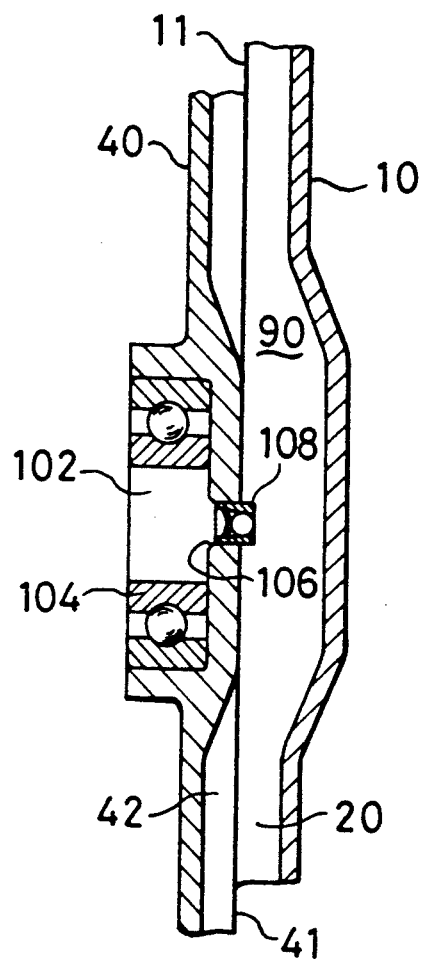
FIG. 3 is a fragmentary sectional view of the transmission taken along line III—III in FIG. 2.
Figure 4:
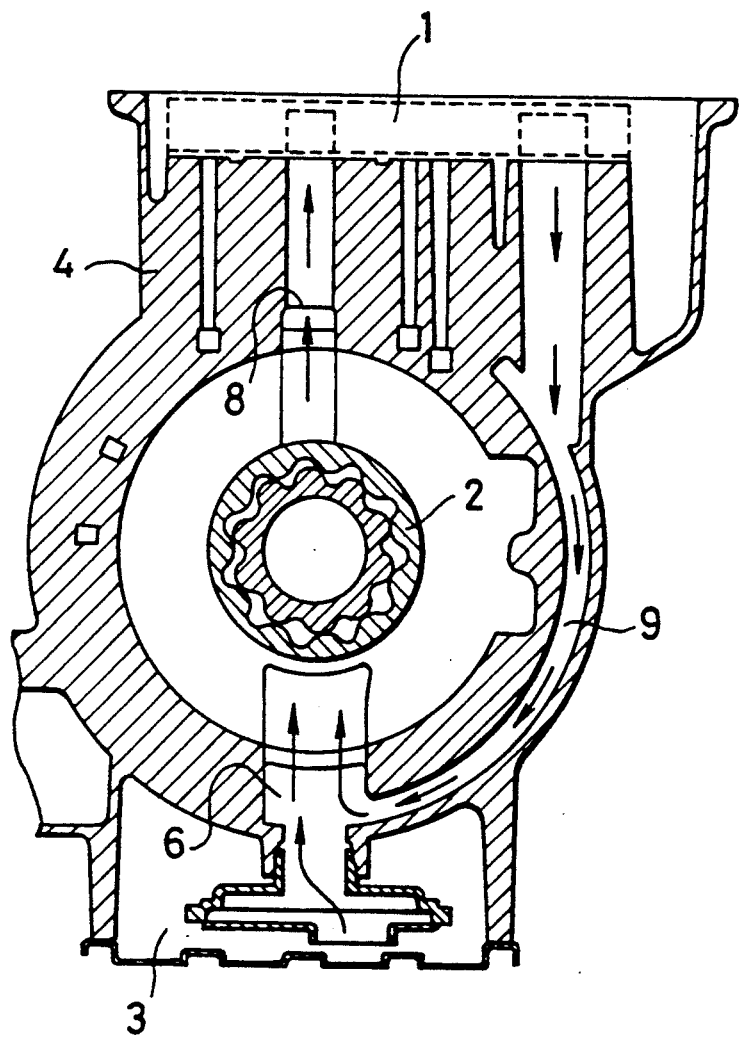
FIG. 4 is a schematic sectional view illustrating a technical concept for laying out hydraulic circuits for the apparatus of the present invention.

As shown in FIG. 3, the groove 42 on the transmission case 40 side is dimensioned to have a depth of substantially zero in the region where it overlaps the bearing holding portion 102 for the counter shaft 100, resulting in a degree of freedom in respect of lay-out of the counter gear 110 being increased. Corresponding to this, the region where the groove 20 on the oil pump housing 10 side overlaps the bearing holding portion 102 is dimensioned to have a depth more than that of the remaining region with the result that the cross-sectional area of the groove 20 is kept substantially constant along the whole length of the drain path 90. A supply hole 106 kept opened to the drain path 90 is formed at the bearing holding portion 102 on the wall of the transmission case 40, and a one-way or a check valve 108 is fitted into the supply hole 106 so as to allow hydraulic oil to be supplied to the bearing holding portion 102 from the drain path 90 through the supply hole 106.

Since the apparatus of the present invention is constructed in the above-mentioned manner, the drain path 90 can smoothly extend on the oil pump housing 10 not only without any interference with many paths and associated ports arranged in the oil pump housing 10 but also without any possibility that the apparatus is designed to have larger dimensions due to extra extension of the drain path 90 around the bearing holding portion 102.

In the case that the counter shaft 100 is dislocated to a different position represented by a two-dot chain line as shown in FIG. 2, design change is achieved without substantial modification merely by properly adjusting the depth of each groove at a bearing holding portion 102'.

In addition, when the depth of the groove 20 on the oil pump housing 10 is dimensioned to assume a sufficient path cross-sectional area or the depth of the groove 42 on the transmission case 40 is dimensioned to be substantially constant along the whole length of the groove 42 without variation in the region where the groove 42 overlaps the bearing holding portion 102, there does arise any particular necessity for changing the oil pump housing 10.

While the present invention has been described above merely with respect to a single preferred embodiment thereof, it should of course be understood that the present invention should not be limited only to this embodiment but various change or modification may be made without departure from the scope of the invention as defined by the appended claims.

What is claimed is:

1. A hydraulic oil supplying apparatus for an automatic transmission comprising:
   a transmission case having a gear type speed changing mechanism incorporated therein and including a hydraulic control valve for controlling said speed changing mechanism at an upper portion thereof and a bearing holding portion for a counter shaft;
   an oil pump housing secured to said transmission case via a joint surface thereof, said oil pump housing being formed with a central through hole through which an input shaft extends, a gear chamber receiving pump gears therein, a discharge path and a suction path arranged in substantial alignment with each other in the vertical direction, and a substantially arch-shaped first groove extending to a lowermost end of said suction path on said joint surface to constitute a drain path from said control valve, said first groove overlapping said bearing holding portion when it is observed in the direction at a right angle relative to said joint surface; and
   a pump cover secured to said oil pump housing to cover said gear chamber therewith.

2. The apparatus as claimed in claim 1, wherein said transmission case is formed with a second groove corresponding to said first groove on said joint surface to said oil pump housing, said first groove and said second groove constituting said drain path from said control valve.

3. The apparatus as claimed in claim 1, wherein a supply hole is formed on a wall of said bearing holding portion so as to allow hydraulic oil to be supplied to said bearing holding portion from said drain path, said supply hole being kept opened in communication with said drain path.

4. The apparatus as claimed in claim 2, wherein a supply hole is formed on a wall of said bearing holding portion so as to allow hydraulic oil to be supplied to said bearing holding portion from said drain path, said supply hole being kept opened in communication with said drain path.

5. The apparatus as claimed in claim 3, wherein a check valve is disposed in said supply hole.

6. The apparatus as claimed in claim 4, wherein a check valve is disposed in said supply hole.

7. The apparatus as claimed in claim 4, wherein said second groove is dimensioned to have a first predetermined depth in the region where it overlaps said bearing holding portion as seen in the axial direction perpendicular to said joint surface, said first predetermined depth being less than a depth in the region other than the foregoing region and wherein said first groove is dimensioned to have a second predetermined depth in the region where it overlaps said bearing holding portion as seen in the axial direction perpendicular to said joint surface, said second predetermined depth being more than a depth in the region other than the foregoing region.

8. The apparatus as claimed in claim 1, wherein said oil pump housing is secured to said transmission case by a plurality of bolts arranged in substantially annular relationship, and said first groove is located outside of said bolts as seen in the radial direction.

* * * * *